United States Patent
Diersbock

[15] 3,668,860
[45] June 13, 1972

[54] HIGH VOLTAGE WATCH POWER SUPPLY

[72] Inventor: Gunther Rudalph Diersbock, Waterbury, Conn.

[73] Assignee: Timex Corporation, Waterbury, Conn.

[22] Filed: Nov. 5, 1970

[21] Appl. No.: 87,215

[52] U.S. Cl. ........................................................58/23 BA
[51] Int. Cl. ..........................................................G04c 3/00
[58] Field of Search ............................58/23, 23 BA, 24–26

[56] References Cited

UNITED STATES PATENTS

| | | | |
|---|---|---|---|
| 3,080,501 | 3/1963 | Charbonnier | 58/23 R |
| 3,509,714 | 5/1970 | Walton | 58/23 R X |

Primary Examiner—Richard B. Wilkinson
Assistant Examiner—Edith C. Simmons
Attorney—Richard A. Joel

[57] ABSTRACT

A power supply for a watch including voltage multiplying means or transforming means to increase the voltage of a power cell to a higher voltage capable of operating electrical and electronic devices used in watches requiring voltage higher than the conventional 1.5 volts. These include highly efficient quartz oscillators and dividing units, MOS integrated circuits, solid state indicating systems, crystals, piezoelectrical and electrostatic motors and piezoelectric alarm systems, and associated systems. A DC–AC converter or chopper is connected respectively to a voltage multiplier or transformer and the high voltage output therefrom is suitable for driving various types AC or DC systems used in watches. The use of a plurality of batteries or other undesirable structures is thereby avoided.

8 Claims, 6 Drawing Figures

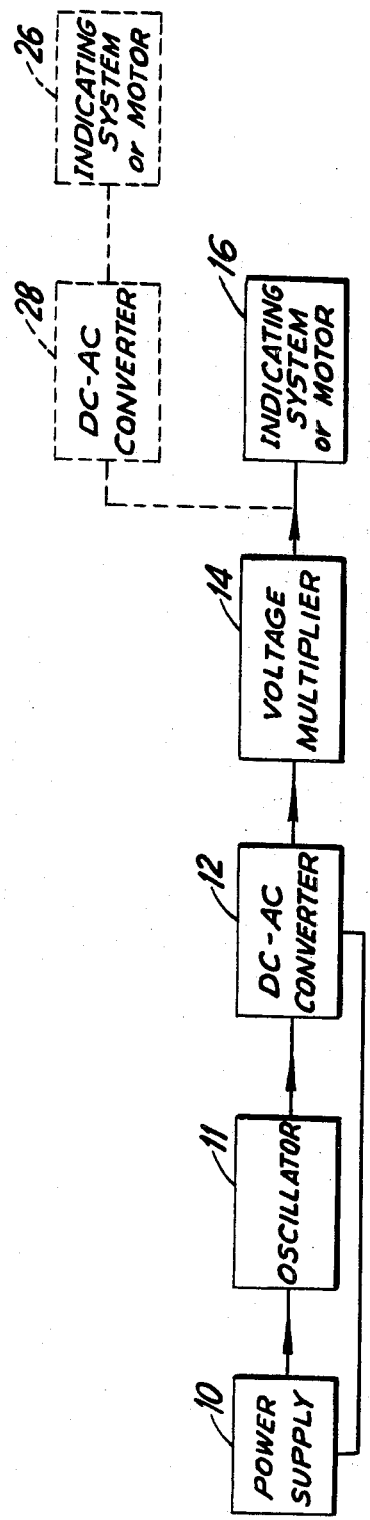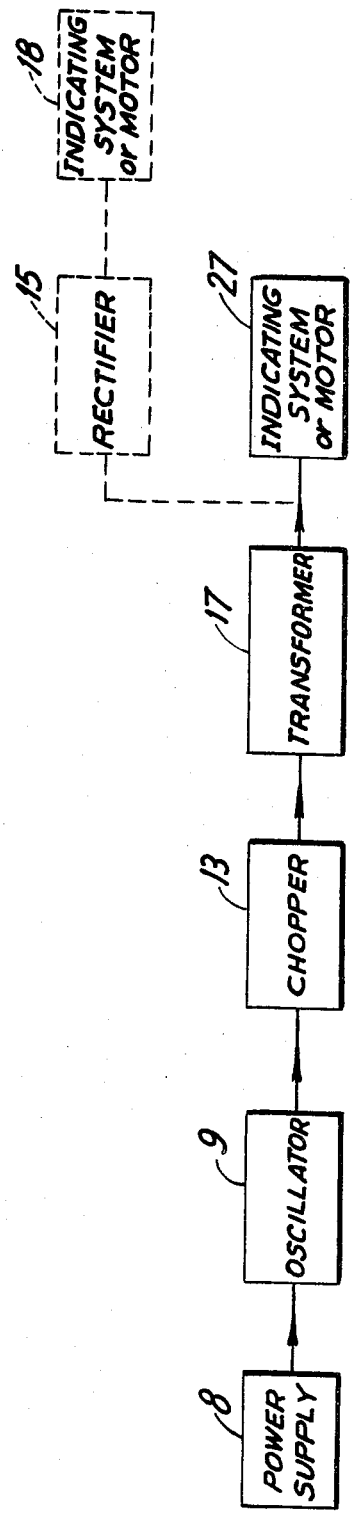

INVENTOR.
GUNTHER R. DIERSBOCK
BY
ATTORNEY 3,668,860

HIGH VOLTAGE WATCH POWER SUPPLY

BACKGROUND OF THE INVENTION

The present invention relates to horology and more particularly to a high voltage power supply for a watch.

In conventional electric or electronic watches, the power supply comprises an energy cell having an output voltage in the order of 1.5 volts. Higher power levels require either additional cells or larger cell arrangements. Since space is a prime consideration in watch designs, it is highly undesirable to select either of the aforementioned alternatives and yet present and future solid state watches will require higher voltages. With voltages of about 5 volts, MOS techniques can be used for all circuits and solid state indicating systems are feasible. Furthermore, piezoelectric motors and alarm systems having voltage inputs of 5–30 volts may be employed.

The prior art is represented by U.S. Pat. No. 3,194,003 disclosing a solid state electronic timepiece and U.S. Pats. Nos. 3,048,766 and 3,292,073 directed to converter arrangements which step up DC voltage from a lower to a higher level. U.S. Pats Nos. 3,443,194 and 3,453,520 disclose transformer circuits which are of interest in this area. Of course, the aforementioned patents are not intended to be an exclusive listing of the prior art since other patents may also be pertinent to this area.

SUMMARY OF THE INVENTION

The present invention relates to a power supply for an electric or electronic watch comprising an oscillator providing a pre-determined frequency which is used to operate a DC–AC converter or chopper. The AC voltage is transformed or multiplied to a high voltage level. The high voltage level achieved, still using the conventional 1.5 volts energy cell, permits the use of MOS circuitry, liquid crystal displays, light emitting diode displays and various solid state indicating systems. Also piezoelectric components may be used for motors and alarms which require a voltage in the order of 5 to 30 volts. More accurate oscillators can be built by eliminating the voltage limitation which presented a problem heretofore.

Accordingly, it is an object of this invention to provide a new and improved high voltage watch.

Another object of this invention is to provide a unique high voltage power supply for an mechanical electrical or electronic watch.

Other objects and advantages of the present system will be more clearly seen when viewed in conjunction with the accompanying drawings wherein:

FIG. 1 is a block diagram of a first embodiment of the invention;

FIG. 2 is a block diagram of a second embodiment of the invention,

DETAILED DESCRIPTION OF THE INVENTION

Figure 3:
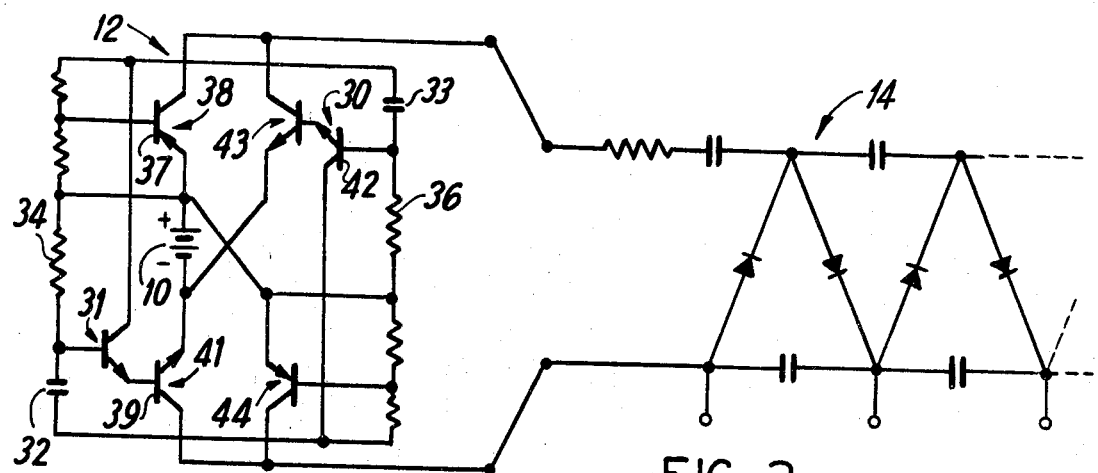
FIG. 3 is a circuit drawing of the first embodiment of the invention disclosed in FIG. 1 showing in detail portions thereof.

As shown in FIG. 1, a high voltage power supply for a watch comprises a power supply 10 such as a conventional energy cell which furnishes 1.5 volts to the oscillator 11. The oscillator 11, which may be a balance wheel and switch arrangement or an electronic oscillatory circuit supplies a certain frequency to the DC–AC converter 12. The AC output (polarized DC output) of the converter 12 is fed to the voltage multiplier 14 which may be of the type disclosed in U.S. Pat. No. 3,295,047 to Z. Tanzy-Hornoch, to provide a high voltage.

The voltage is multiplied in each stage of the multiplier 14 and changed from an AC voltage to a higher DC voltage. The output is a function of the number of multiplier stages used and the 1.5 volt input could be increased to 3 volts, to 6 volts, or to higher values. The output voltage is raised to a level sufficient to operate an indicating system or motor 16 which requires a higher DC voltage than that furnished by the 1.5 volt energy cell. If the motor indicator 26 is used which requires an AC input a DC–AC converter 28 may be connected between multiplier 14 and motor 26.

Figure 6:
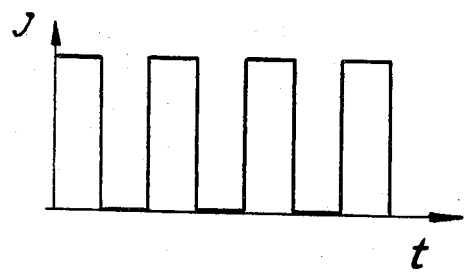

In FIG. 2, the chopper 13 converts DC voltage from power supply 8 and oscillator 9 into DC pulses, see FIG. 6. The pulses are transformed into a high AC voltage in the transformer 17 and, if necessary, rectified by rectifier 15 to a predetermined DC voltage. This voltage is fed to the indicating system or motor 18 which may be a MOS circuit, a solid state display or a piezoelectric motor. On the other hand, the output of transformer 17 may be fed directly to a motor or indicating system 27 compatible with the AC output.

FIG. 3 discloses the power supply 10, oscillator 11, converter 12 and voltage multiplier 14 of FIG. 1 in greater detail. The oscillator with a DC–AC converter 12 is connected to a cascade doubler stage of a voltage multiplier 14. The transistors 30 and 31 function as a multivibrator in combination with capacitors 32 and 33 and timing resistors 34 and 36. In operation, with 31 initially saturated, 30 is cut off. After a predetermined period of time $t2$, transistor 30 saturates as a function of the timing circuit, capacitor 33 and resistor 36, while transistor 31 is driven to cut off. After a period of time $t1$, transistor 31 saturates as a function of the timing circuit including capacitor 32 and resistor 34, transistor 30 becomes cut off. The multivibrator continues to function at a frequency determined by the timing circuits resistor 34—capacitor 32 and resistor 36—capacitor 33.

When transistor 31 saturates, the base 37 of transistor 38 becomes negative and transistor 38 saturates. The base 39 of transistor 41 becomes positive and transistor 41 also becomes saturated. At the same time, the base 42 of transistor 30 becomes negative and cuts off which in turn cuts off transistors 43 and 44. Current flows from the positive terminal of the battery 10 through transistor 38 and the load through transistor 41 back to the battery's negative terminal.

Figure 5:
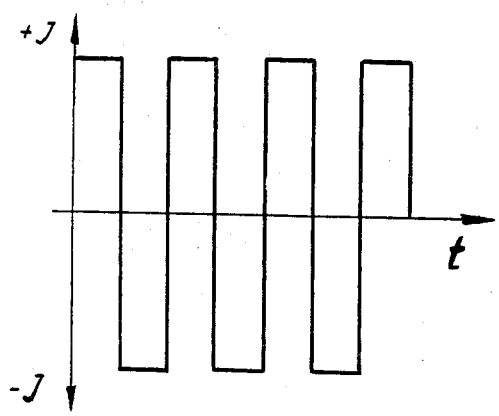
FIG. 5 shows the polarized DC signals which are fed to the input of the voltage multiplier of FIG. 1; and, FIG. 6 shows the DC pulse output wave forms from the chopper of FIG. 2.

After the time $t2$, transistor 30 saturates as well as transistor 43 and 44 and transistor 31, 38, and 41 are cut off. Current flows in the opposite direction from the positive battery terminal through transistor 44 and load and through transistor 43, back to the negative battery terminal. This AC output, see FIG. 5, is fed to the voltage multiplier 14 which multiplies the voltage in each stage, for example, 3 volts, 6 volts, etc. and converts the AC voltage to a higher DC voltage. The main circuit elements, in general, are standard units so further discussion is not necessary.

Figure 4:
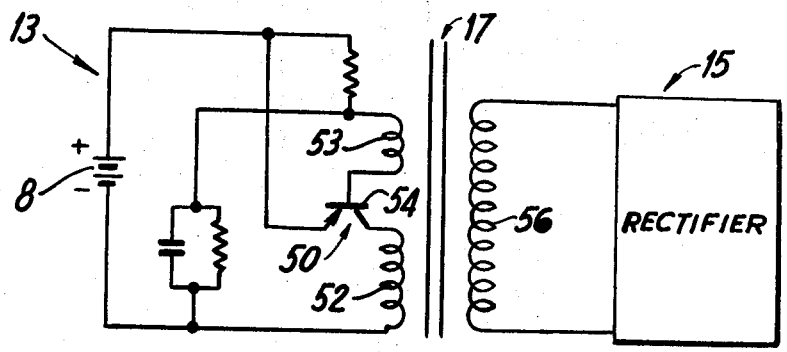
FIG. 4 is a circuit drawing illustrating portions of the second embodiment of the invention disclosed in FIG. 2 in greater detail.

FIG. 4 discloses in greater detail a portion of the second embodiment of the invention involving a chopper 13 connected to a transformer 17 and possibly a rectifier 15. The chopper 13 converts DC voltage into DC pulses, as shown in FIG. 6, which are then transformed to a high AC voltage in the transformer 17 and rectified to the predetermined DC voltage if desired as shown in dotted line.

Since the circuit elements of FIG. 4 are conventional, only a brief description of their operation will be given. Accordingly, when transistor 50 is saturated, current flows through a primary winding 52 of the transformer 17. The current builds up a magnetic field in the ferrite core of the transformer 17 which induces a negative voltage in the transformer coupled feed back winding 53 and eventually shuts off the transistor 50. The current through winding 52 and the magnetic field cease. The cycle then repeats with the base 54 of transistor 50 becoming positive and the transistor 50 being driven to saturation. The current pulses in winding 52 are transformed to a high voltage in the secondary winding 56. While FIG. 4 shows one type of chopper circuit, many other types of choppers and oscillators can be used for this invention.

It is also to be noted that depending upon the circuit requirement, it may be possible to combine various portions of the circuits shown in FIGS. 1 and 2. For example, the output of the converter 12 in FIG. 1 could be fed to the transformer 17 of FIG. 2, the remainder of the circuit staying the same. On the other hand, the output of the chopper, transformer 13, 17 of FIG. 2 could be fed to the voltage multiplier 14 of FIG. 1 with the rest of the circuit remaining the same.

The invention as thus described above opens new vistas in watch design permitting the use of new technologies within the stringent space limitations of a watch. These new technologies and components generally require high voltages which have not been available heretofore. The power supply of the present invention provides a voltage capable of operating highly efficient quartz oscillators circuits, solid state indicating systems, liquid crystals, piezoelectric and electrostatic motors and piezoelectric alarm systems, for mechanical, electrical and electronical watches.

I claim:

1. A high voltage power supply for a watch comprising:
   a low voltage power supply,
   an oscillator connected to the low voltage power supply and driven thereby,
   means for converting the oscillator output into a series of pulses,
   means for increasing the voltage of the output from the converting means to provide a high voltage output, and
   means driven by the high voltage output from the voltage increasing means to indicate time.

2. A high voltage power supply for a watch in accordance with claim 1 wherein:
   the converting means comprises a DC-AC converter for changing the oscillator input to AC pulses, said means being connected to the power supply,
   the voltage increasing means comprises a voltage multiplier, and
   the driven means comprises a watch motor.

3. A high voltage power supply for a watch in accordance with claim 2 further including:
   a DC-AC converter connected to the voltage multiplier to provide an AC output to the driven means, and, wherein
   the driven means comprises an AC motor.

4. A high voltage power supply for a watch in accordance with claim 1 wherein:
   the converting means comprises a chopper for changing the oscillator output into DC pulses,
   the voltage increasing means comprises a transformer, and,
   the driven means comprises a watch motor.

5. A high voltage power supply for a watch in accordance with claim 4 wherein:
   a rectifier is connected to the tranformer output to provide a DC output therefrom, and,
   the driven means comprises a DC motor.

6. A high voltage power supply for a watch in accordance with claim 2 wherein:
   the voltage multiplier comprises a plurality of cascaded doubler stages, and
   the oscillator includes a multivibrator.

7. A high voltage power supply for a watch in accordance with claim 1 wherein:
   the converting means comprises a DC-AC converter for changing the oscillator input to AC pulses, said means being connected to the power supply,
   the voltage increasing means comprises a voltage multiplier,
   the driven means comprises a display.

8. A high voltage power supply for a watch in accordance with claim 1 wherein:
   the converting means comprises a chopper for changing the oscillator output in DC pulses,
   the voltage increasing means comprises a transformer, and,
   the driven means comprises a display.

* * * * *